United States Patent [19]

Siegel et al.

[11] Patent Number: 5,037,079
[45] Date of Patent: Aug. 6, 1991

[54] VACUUM PLATEN TRANSPORT PLENUM VACUUM SHUTTER

[75] Inventors: Robert P. Siegel, Penfield; William Brant, Rochester, both of N.Y.

[73] Assignee: Xerox Corporation, Stamford, Conn.

[21] Appl. No.: 487,314

[22] Filed: Mar. 2, 1990

[51] Int. Cl.⁵ .............................................. B65H 5/22
[52] U.S. Cl. ......................................... 271/3; 271/6; 271/7; 271/10; 271/276; 271/197; 271/96
[58] Field of Search .................... 271/3, 3.1, 6, 7, 276, 271/306, 196, 197, 12, 13, 4, 10, 194, 96

[56] References Cited

U.S. PATENT DOCUMENTS

| | | | |
|---|---|---|---|
| 4,168,829 | 9/1979 | Wilson et al. | 271/108 |
| 4,592,542 | 6/1986 | Selak | 271/9 |
| 4,819,928 | 4/1989 | Osborn et al. | 271/276 |

FOREIGN PATENT DOCUMENTS 56-23147 3/1981 Japan .
342827 6/1972 U.S.S.R. .

Primary Examiner—David H. Bollinger

[57] ABSTRACT

A mechanism for shuttering of vacuum ports of a vacuum platen transport (VPT) plenum in correspondence with the size of the documents being transported from the document tray of a recirculating document handler. The shuttering mechanism is coupled to a movable side guide of the document tray and includes a flexible coiled tape mounted with respect to the vacuum plenum of the VPT and movable side guide of the document tray such that movement of the side causes the tape to seal off vacuum slots within the plenum that are not located beneath documents.

12 Claims, 2 Drawing Sheets

VACUUM PLATEN TRANSPORT PLENUM VACUUM SHUTTER

This invention relates to a vacuum sheet feeding apparatus, and more particularly to a selectively movable tape in a vacuum document handler for controlling the area of vacuum application transverse to the sheet feed path of a sheet feeding apparatus, the position of the tape being dependent upon the size of the sheets being fed.

It is well known in the copier/duplicator field to feed sheets from a stack seriatim by vacuum pick-off apparatus. While intermittently moving fingers or sucker arms have been used in the past, more recently oscillating (or rotating) vacuum cylinders have been utilized for sheet feeding in order to achieve higher operational speeds. Generally, the oscillating or rotating vacuum cylinder feed apparatus include a ported cylindrical housing in juxtaposition with a stack of sheets to be fed. A vacuum source connected to the housing creates a reduced pressure atmosphere which induces the tacking of sheet to the surface thereof and holds it there while the rotation of the housing strips the sheet from the stack and delivers the sheet to a downstream feeding mechanism.

If a vacuum feed apparatus is required to handle sheets of varying widths (in the transverse direction to the sheet feed path), care must be taken to insure that all open ports in the housing are covered by a sheet being fed or the effectiveness of the vacuum may be lost. To accomplish this end, the ports may be located only within the marginal dimension of the narrowest sheet to be fed, or a valve may be provided to close the outboard ports when a sheet of narrower dimension is being fed. If the ports are located within the narrowest marginal dimension of a sheet to be fed, the outside marginal edges of wider sheets will now be under vacuum control during feeding and may cause jamming of the feeder. On the other hand, a valve to control outboard ports has heretofore required operator intervention during the feed cycle to assure proper setting of the valve dependent on the size of sheets being fed.

An attempt at solving this problem is contained in U.S. Pat. No. 4,168,829 in the form of a mechanism for positioning a control valve for an oscillation vacuum feeder which automatically adjusts the position of the control valve in relation to the width of sheets to be fed. Also, U.S. Pat. No. 4,592,542 discloses a sheet feeding apparatus comprising a feed opening capable of accommodating sheet of various widths. The apparatus utilizes a plurality of suction cups to convey sheets from the bottom of a stack. A suction control can selectively disconnect suction from any suction cups, therefore adjusting the vacuum width of the feed apparatus. Russian Reference No. 342,827 discloses a rotary printing machine capable of feeding sheets of different widths. The printing machine utilizes paper a pick up vacuum drum containing an adjustable screw mechanism to vary the suction area of the vacuum drum as required by various sheet sizes. Japanese Reference No. 56-23147 discloses a sheet feeding apparatus comprising a rotary drum containing numerous suction holes. A control means is utilized to open or close select suction holes to accommodate sheets of various widths. However, these systems for controlling vacuum pressure within a vacuum roll feeder are not practical when applied to a vacuum document handler plenum with a substantially flat document support surface.

Accordingly, it is the purpose of this invention to provide a mechanism for shuttering of vacuum ports of a vacuum platen transport (VPT) plenum in correspondence with the size of the documents being handled within a document feeder. The shuttering mechanism is coupled to document tray side guides of the document feeder either mechanically or electrically. The VPT includes a vacuum plenum and a flexible coiled tape mounted with respect to the vacuum plenum and the side guides of the document tray such that movement of the side guides causes the tape to seal off vacuum slots within the plenum that are not located beneath documents.

For a better understanding of the invention as well as other features thereof, reference is made to the following drawings and descriptions.

Figure 1:
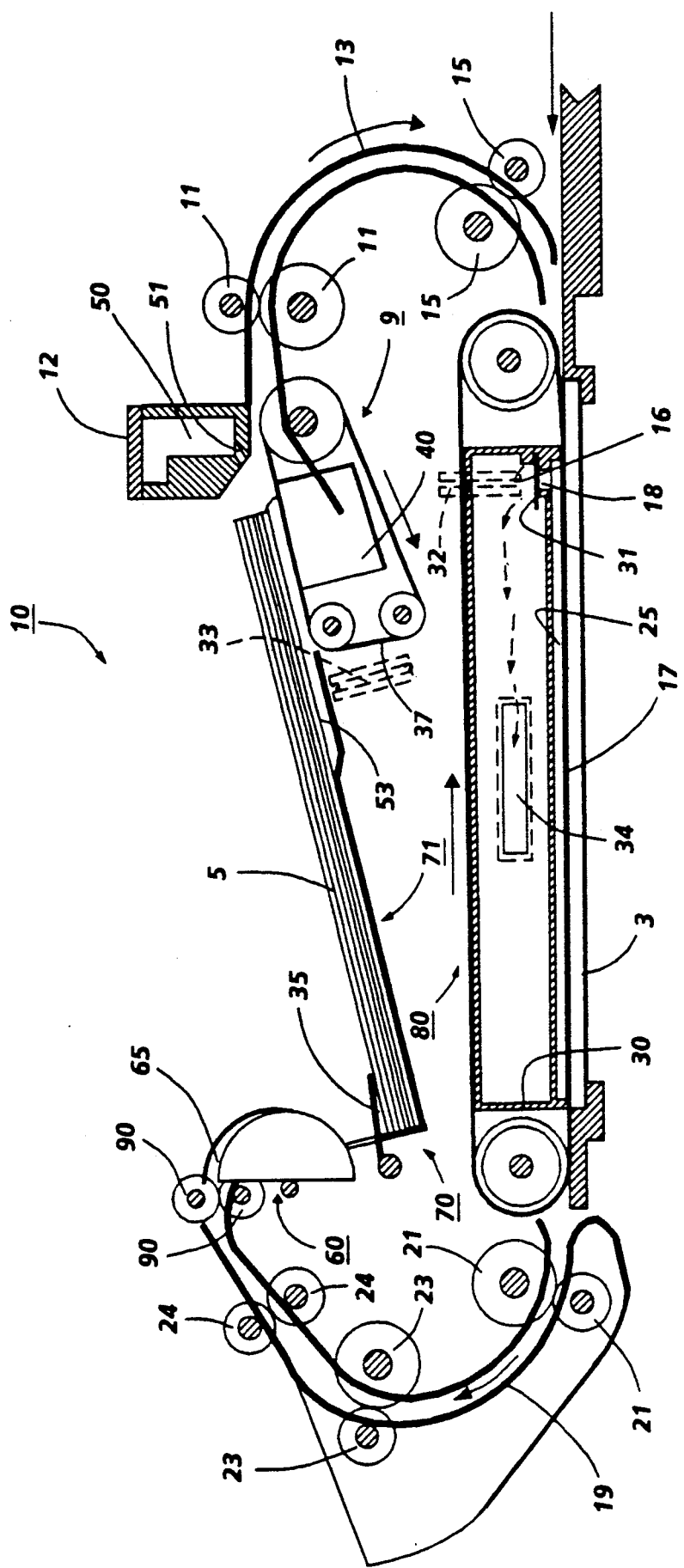
FIG. 1 is a schematic elevational view of a recirculating document handler incorporating the features of the present invention.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

For a general understanding of the features of the present invention, reference is had to the drawings. In the drawings, like reference numerals have been used throughout to designate identical elements.

Referring to the drawings, an automatic document handler 10 is illustrated installed above the exposure platen 3 of a xerographic reproduction machine. The document handler is provided with a document tray 70 adapted for supporting a stack of documents 5 face up. A vacuum belt-corrugating feeder mechanism 9 is located below the document tray for acquiring and corrugating the bottom document in the stack and forwarding the document to take away roll pair 11 after an air knife 12 has had time to separate sheet one from the rest of the stack. The document is then fed by take-away roll pair 11 through document guide 13 to feed-roll pair 15 and under platen belt 17 onto the platen of the copy machine for reproduction. After exposure of the document, it is fed off the platen by belt 17 into guide 19 and feed-roll pairs 21 and 23 and through corrugator roll pair 90 either to disc 60 which is conventionally mounted on a drive shaft (not shown). The disc has an arcuate slot 65 on its periphery which is open at one end of the disc and which as shown in FIG. 1 is roughly in line to receive documents from the exit portion of the guide 19. In this position, when flipping or inverting of the document is required for proper collation, the slot 65 communicates with guide 19 for receiving a document that has been forwarded by transport belt 17 and feed roll pairs 21, 23, 24. If flipping of the document is not required, disc 60 is moved to an out-of-line position away from the path of the document and it is fed past an arcuate surface of disc 60 and into tray 70. Corrugation rolls 90 are adapted to corrugate the documents en route to tray 70 for straightening or decurling purposes.

The document handler is also provided with a sheet separator finger 35 as is well known in the art to separate the documents to be fed from those documents returned to the document handler. Upon removal of the last document from beneath sheet separator finger 35, the finger 35 drops through a slot provided in the tray, suitable sensors are provided to sense that the last document in the set has been removed from the tray and the finger is then rotated in a clockwise direction to again come to rest on the top of the documents in the stack prior to subsequent recirculation of the document set.

With continued reference to FIG. 1, document tray 5 is provided with a depressed portion of pocket 53 having a generally parabolic outline behind a feed belt assembly while a plurality of feed belts 37 are supported for movement around vacuum plenum 40. Vacuum plenum 40 is spaced within the runs of the belts 37 and has openings therein adapted for cooperation with perforations in the belts 37 to provide a vacuum for pulling the bottom documents in the document stack onto the belts 37. The plenum is provided with a raised portion beneath the center belt run so that upon capture of the bottom document in the stack against belts 37, a center corrugation will be produced in the bottom sheet. Thus, the document is corrugated into a double valley configuration. The flat surfaces of the vacuum belts on each side of the raised center belt generates a region of maximum stress in the document which varies with the document beam strength. In the unlikely event that more than one document is pulled down into contact with the feed belts, the beam strength of the second document resists the corrugating action, thus gaps are opened between sheets one and two which extend to their lead edges. These gaps and channels reduce the vacuum levels between sheets one and two due to porosity in sheet one and provide for entry of the separating air flow from the air knife 12. The air knife 12 comprised of pressurized air plenum 50 having a plurality of air jet openings 51 is provided to inject air between the document pulled down against the feed belts and the documents thereabove to provide an air cushion or bearing between the stack and the bottom document to minimize the force necessary for removing the bottom document from the stack. It can be understood that if two documents are pulled down toward the belts 37, since the top sheet would not be corrugated, the air knife would inject air into the space between the two documents and force the second document off from the raised belt back toward the document stack.

Figure 2:
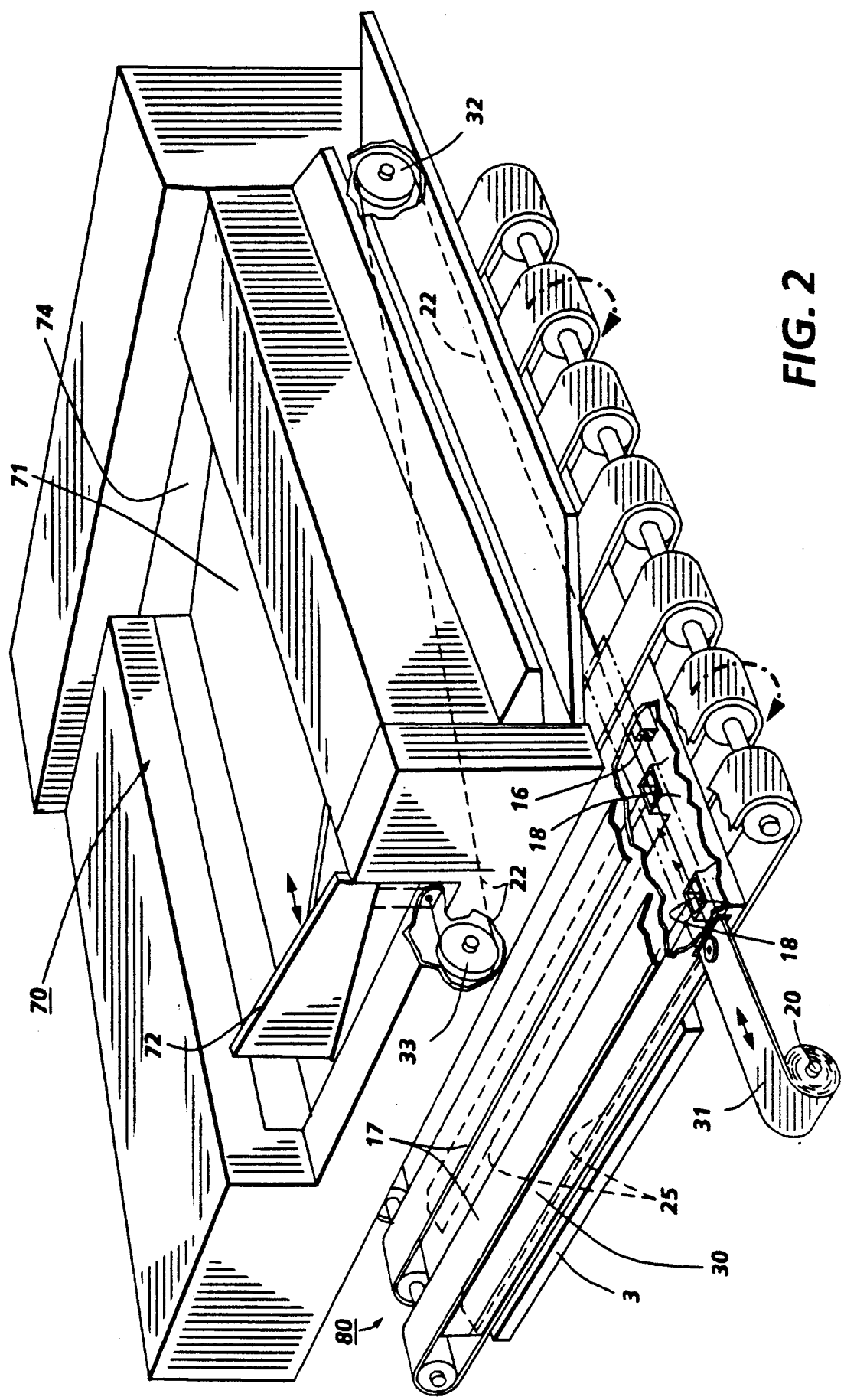
FIG. 2 is an enlarged, isometric, partial view of the exemplary vacuum platen transport plenum shuttering device in accordance with the present invention.

The vacuum platen transport (VPT) 80 shown in FIGS. 1 and 2 is part of a recirculating document handler that includes a document tray 70 with a document support surface 71 flanked by movable side guide 72 and stationary side guide 74. The width of documents in the direction transverse to the direction of feed may range from, for example, 5½" to 17". Movable side guide 72 is attached to one end of cable 22 that is mounted around pulleys 32 and 33 and connected at its other end to a flexible shutter member in the form of a steel or plastic tape 31 which is coiled around a shutter take-up member 20. VPT 80 includes a plenum 30 that has a shutter track 16 therein that allows tape 31 to move back and forth therein. Plenum 30 also has vacuum slots or holes 18 in a portion thereof that are in communication with a conventional vacuum source 34. The vacuum slots are positioned above platen 3 of a conventional or electronic copier and are adapted to support documents above the platen for exposure to imaging portions of the copier.

Flexible shutter 31 travels within shutter track 16 to seal off vacuum slots 18 which are located beyond the actual width of documents in tray 70. The shutter could be implemented in a number of different ways, For example, it could be actuated by means of cable 22 linkage on a one-to-one basis with the document feeder side guide as shown such that as an operator moves the side guide into position for a predetermined size of document, the cable extends the shutter over the vacuum slots starting at the edge of the transport away from side registration. The result is that vacuum is accessed only in the areas corresponding to the width of the document. The shutter could also be implemented either at only the row of vacuum slots at the acquisition end or at both ends of the transport. The shutters could also be positioned electrically either automatically or at the push of a button by the operator. One could have a second pulley system in the rear of the tray which would service the exiting portion of the vacuum transport, if desired.

While steel tape shutter 21 closes off plenum slots 18 which are outside the selected document size, it also acts as a constant force spring. The "exclusive vacuum" of this system (only those vacuum ports over a document being exposed) can raise drive force of the vacuum source by as much as 30 to 50% when a small document is being transported.

As seen in FIG. 2, vacuum channels 25 are in communication with vacuum slots or holes 18 and lead away from the slots through a major portion of the bottom surface of vacuum plenum 30. The vacuum channels serve to spread the vacuum from the vacuum slots throughout a major portion of the bottom surface of vacuum plenum 30 to thereby tack a document to belts 17 in order for the document to be transported by the belts off the platen 3. While a series of vacuum belts 17 mounted on a series of rollers are shown, it should be understood that a single perforated belt mounted mounted around single roll at opposite ends would could be used as well.

It should be understood that plenum vacuum shutter has been disclosed whereby the suction area beyond the area of a predetermined document size is closed off by means of a flat strip of flexible material which can be stored in a coil, like a measuring tape, shutting off the vacuum slots in a plenum of a vacuum transport of a vacuum document handler that are located in a straight row. This is made possible by the shape of the vacuum device which is a rectangular prism with vacuum channels running away from the vacuum slots and along a major portion of the length of the prism as oppose to the cylindrical shape of drums in prior art devices.

While there has been illustrated and described what is at present considered to be a preferred embodiment of the invention, it will be appreciated that numerous changes and modifications are likely to occur to those skilled in the art, and it is intended in the appended claims to cover all those changes and modifications which fall within the true spirit and scope of the invention.

We claim:

1. In a recirculating document feeder that includes a substantially flat and rectangular document tray and at least one movable side guide for adjusting the document tray to the size of documents to be fed, the improvement of a vacuum platen transport system, comprising: a vacuum plenum with a plurality of vacuum slots therein at predetermined positions spaced across the width thereof to match the width of documents to be fed from the document tray in order to attract each document fed from the document tray thereto, said vacuum plenum having a shutter guide therein; flexible shutter means positioned for movement within said shutter guide; and means connected to said movable side guide and said shutter means, whereby movement of said movable side guide adjusts said shutter means to close off said vacuum slots of said vacuum plenum that are not covered by a document.

2. The improvement of claim 1, wherein said flexible shutter means is a tape.

3. The improvement of claim 2, wherein said tape is made of metal.

4. The improvement of claim 2, wherein said means connected to said movable side guide and said shutter means comprises a cable and pulley arrangement.

5. The improvement of claim 2, including at least one belt surrounding said vacuum plenum and adapted to be rotated in order to transport documents past said vacuum plenum.

6. The improvement of claim 5, wherein said vacuum plenum includes channels running along a major portion of a surface thereof and communicating with said vacuum slots in order to tack a document to said at least one belt.

7. In a vacuum platen transport adapted to support and transport documents above the platen of a copier that includes a document tray having a movable side guide adapted to be moved in accordance with the size of documents within the tray, the improvement comprising: a vacuum plenum, said vacuum plenum including a plurality of vacuum slots therein at predetermined positions spaced across the width thereof to match the width of documents to be transported in order to attract each document thereto; shutter means positioned for movement within said vacuum plenum over said vacuum slots; and means connected to said movable side guide and said shutter means so that movement of said movable side guide moves said shutter means over said vacuum slots and causes said shutter means to close off said vacuum slots of said vacuum plenum that are not covered by a document, and thereby increasing the effectiveness of said vacuum platen transport for the size of documents being fed.

8. The improvement of claim 7, wherein said flexible shutter means is a tape.

9. The improvement of claim 8, wherein said tape is made of metal.

10. The improvement of claim 8, wherein said means connected to said movable side guide and said shutter means comprises a cable and pulley arrangement.

11. The improvement of claim 8, including at least one belt surrounding said vacuum plenum and adapted to be rotated in order to transport documents past said vacuum plenum.

12. The improvement of claim 8, wherein said vacuum plenum includes channels running along a major portion of a surface thereof and communicating with said vacuum slots in order to tack a document to said at least one belt.

* * * * *